United States Patent [19]
Williams

[11] 3,802,285
[45] Apr. 9, 1974

[54] WEAR-RESISTANT MOTION CONTROL SHEAVE

[75] Inventor: William A. Williams, Philadelphia, Pa.

[73] Assignee: T. B. Wood's Sons Company, Chambersburg, Pa.

[22] Filed: Nov. 29, 1971

[21] Appl. No.: 202,858

[52] U.S. Cl.................. 74/230.17 C, 308/238
[51] Int. Cl................................ F16h 55/52
[58] Field of Search......... 308/DIG. 8, 238, 26, 2 R, 308/3 R; 74/230.17 C

[56] References Cited
UNITED STATES PATENTS

| | | | |
|---|---|---|---|
| 3,122,384 | 2/1964 | Luenberger | 308/238 |
| 3,544,415 | 12/1970 | Price et al. | 308/3 R |
| 2,711,103 | 6/1955 | Miner | 74/230.17 C |
| 3,552,223 | 1/1971 | Glasson | 308/238 |
| 3,331,642 | 7/1967 | Kraus | 308/26 |
| 3,304,136 | 2/1967 | Muller | 308/238 |
| 2,861,654 | 11/1958 | Dean | 308/238 |
| 2,162,890 | 6/1939 | Horne | 308/DIG. 8 |
| 3,455,619 | 7/1969 | McGrath | 308/238 |
| 3,194,615 | 7/1965 | Weasler | 308/238 |

Primary Examiner—Charles J. Myhre
Assistant Examiner—R. H. Lazarus
Attorney, Agent, or Firm—B. P. Fishburne, Jr.

[57] ABSTRACT

Radially rigid and axially and circumferentially yielding segmental pads are interposed between the relatively movable hub and sleeve components of a motion control sheave or the like. The ability of these pads to yield under loading allows the necessary relative movements to occur between the hub and sleeve without sliding contact so that wear on these components is reduced substantially to zero. The invention is also applicable to sheaves having polygonal sleeves and matching hubs and to other power transmitting elements rotating with a shaft while being axially adjustable thereon.

11 Claims, 14 Drawing Figures

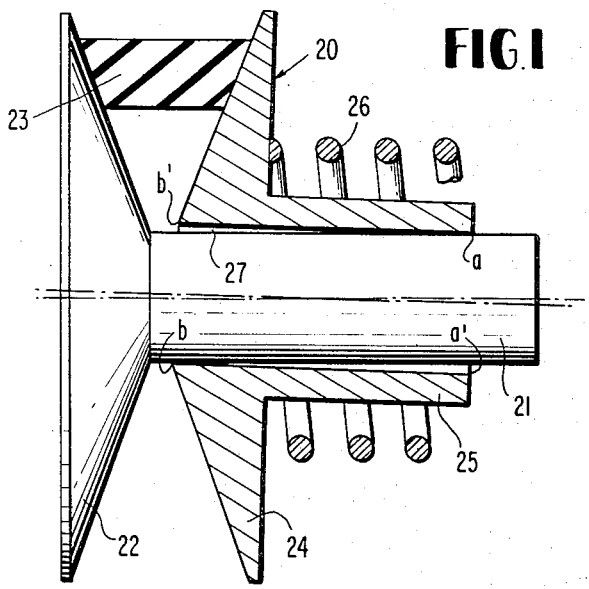
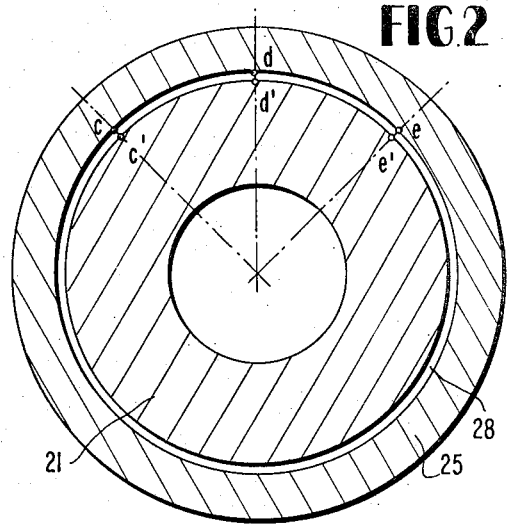
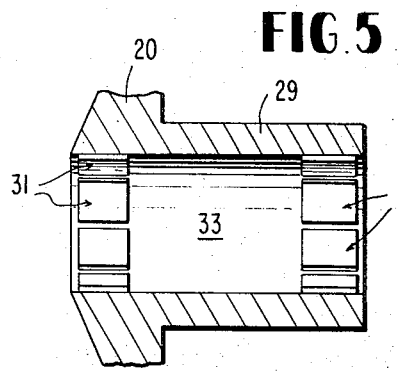
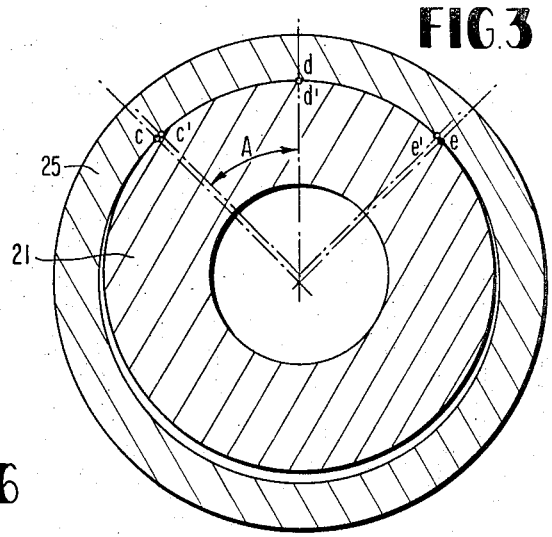
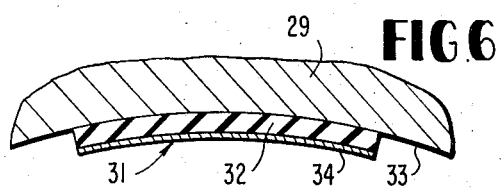
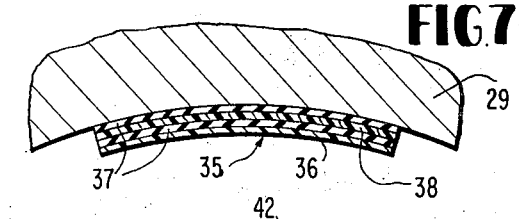
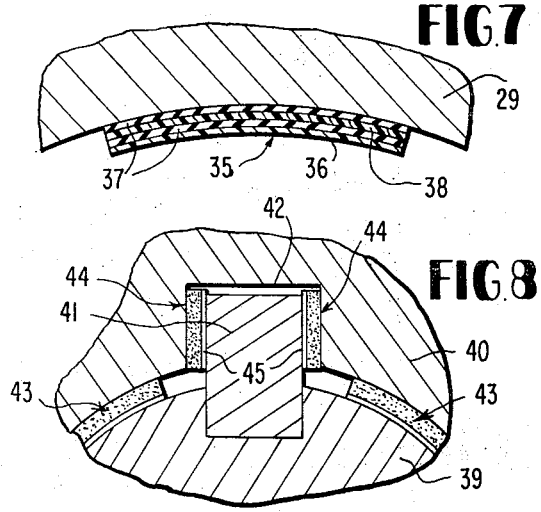
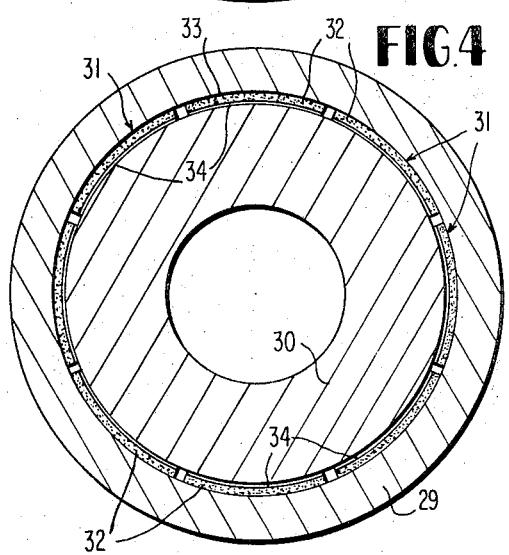

WEAR-RESISTANT MOTION CONTROL SHEAVE

BACKGROUND OF THE INVENTION

There is an ever-increasing need for motion control sheaves of the dry lube type which will operate for long periods of time without having to be refitted with bearings. 20,000 to 30,000 hours of continuous usage without objectionable wear is a long sought-after but as yet unattainable standard. Thus far in the prior art motion control sheaves using various types of dry lube bearing means have been useful for varying periods of time, usually from 5,000 to 10,000 hours but no longer than this without intolerable wear being encountered. The reason for this is simply that the conventional dry lube bearings all have a finite life and eventually dissipate themselves in the process of providing dry lubrication. The greater the load on the sheave and the greater the clearance and therefore the motion between wearing surfaces, the shorter will be the life of the dry lube sheave.

The present invention has evolved in light of the above prior art need and problem and has been successfully developed following an analysis and understanding of the rather subtle movements which inevitably take place in motion control sheaves. As a result of this study and understanding of the true problem involved, a dry lube motion control sheave has been devised which is fully capable of operating without objectionable wear for the sought-after period of 20,000 to 30,000 hours. The essence of the invention which renders it possible to meet the above objective resides in the provision of thin segmental radially stiff or rigid and axially and circumferentially compliant or yielding pads between the movable flange hub and the relatively stationary sleeve of a motion control sheave, at least at the ends of the hub. The pad structure is preferably laminar and embodies a contact facing of high modulus material and alternate layers of yielding and stiff materials in the body of the pad. The result obtained is that the pad is radially rigid under loading but yielding in the directions which allow the relative axial and circumferential movements between the sheave components without subjecting the latter to any frictional sliding and therefore without causing any wear. The invention lends itself to use on conventional sheaves having cylindrical interfitting hub and sleeve parts and on sheaves which have polygonal mating hubs and sleeves, as well as other types of power transmission elements which rotate with shafts and are arranged to shift axially thereon. This would include gears mounted on splines and certain belt pulley arrangements or the like.

Additional features and advantages of the invention and its increased utility over the prior art will be more readily apparent during the course of the following description.

BRIEF DESCRIPTION OF DRAWING FIGURES

FIG. 1 is a side elevational view, partly in section, containing a somewhat exaggerated illustration of a cocking of the flange and flange hub of a motion control sheave when subjected to belt tension loading.

FIGS. 2 and 3 are transverse cross sectional views containing an analysis of movements between the flange hub and sleeve of a motion control sheave under belt tension loading.

FIG. 4 is a transverse vertical section taken through the hub and sleeve of a sheave having the invention applied thereto.

FIG. 5 is a longitudinal vertical section on a reduced scale through the flange hub of a sheave having the invention applied thereto.

FIGS. 6 and 7 are enlarged fragmentary cross sections taken through bonded laminated pads embodying the invention.

FIG. 8 is a fragmentary cross section showing a modified application of the invention to a sheave or the like employing a key.

DETAILED DESCRIPTION

Figure 9:
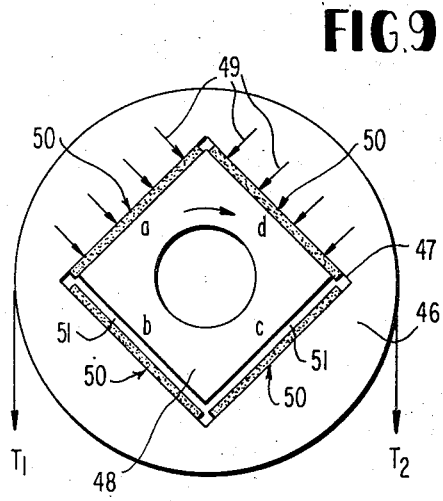
FIGS. 9 to 12 are partly diagrammatic end elevational views showing the invention applied to a motion control sheave having interfitting polygonal hub and sleeve components.

Referring to the drawings in detail wherein like numerals designate like parts throughout, attention is directed first to FIGS. 1 through 3 which graphically illustrate certain inherent relative motions between components of a motion control sheave, such as the sheave 20 shown in FIG. 1. The motion control sheave 20 embodies an interior sleeve 21 which rotates with a shaft, not shown, and this sleeve carries at one end a relatively fixed conical flange 22 engaging one side of a transmission belt 23. A second flange 24 of the sheave is axially shiftable on the sleeve 21 and carries an integral tubular hub 25, the bore of which receives the sleeve 21. The movable flange 20 is customarily loaded against the belt 23 by an expansible spring 26 which surrounds the hub 25. In FIGS. 2 and 3, the sleeve and hub of the sheave are also shown on an enlarged scale.

As shown in FIG. 1, when the belt 23 is pressed by the force of spring 26, a cocking of the flange and hub 25 takes place bringing the opposite ends of the hub bore 27 into contact with the sleeve 21 at diametrically and diagonally opposite points a and b. The clearance between the hub 25 and sleeve is taken up or reduced to zero at the points a and b. Also the point b has moved forwardly of the point b' on the hub and the point a' has shifted forwardly of the point a. Thus, there exists both a radial and an axial movement of the hub 25 relative to the sleeve 21. The extent of axial movement is directly proportional to the radial shift and is a function of the clearance space between the two parts and the length of the hub 25.

There is another more subtle relative movement between the two parts shown in connection with FIGS. 2 and 3. FIG. 2 shows a cross section through the hub and sleeve with a uniform annular clearance 28 therebetween. An external splining system, not shown, is assumed in FIGS. 2 and 3 to maintain the two parts in an unchanging angular relationship. That is to say the points c, c', d, d' and e, e' will always remain on the same radii during rotation of the sheave. FIG. 3 shows a side loading on the sheave produced by belt tension so that the clearance at the points d, d' is reduced to zero. However, it is to be noted that the point c' is circumferentially shifted from the point c and e' is likewise circumferentially shifted although in an opposite direction. Assuming the initial and last points of contact between the parts at $c$ and $e$, there is a 90° arc of contact or bearing between the elements 21 and 25. In this configuration, the difference between $c$ and $c'$, and $e$ and $e'$, is Sin A times clearance (28), which for $A = 45°$ and clerance = 0.005 inch is 0.707 × 0.005 = 0.0035. The total movement between the contacting members as the sheave rotates through 90° is twice this amount or 0.007 inch. As long as there is radial clearance between the parts, and compressibility of bearing material, this minute sliding movement must take place with inevitable gradual wearing of the parts, namely, the hub 25 and sleeve 21.

It has been pointed out that customary constructions of dry lube motion control sheaves employing conventional bearing materials will run for 5,000 to 10,000 hours and no more than this. This is the presence of the clearance and relative movement conditions above analyzed in FIGS. 1 through 3. As previously stated, the wear on the parts is reducable substantially to zero by the present invention so that a comparable dry lube motion control sheave can be run for 20,000 to 30,000 hours without having to be replaced or refitted.

Referring now to FIGS. 4 through 7, the invention is shown as applied to a motion control sheave having an axially movable flange hub 29 mounted upon an axially fixed sleeve 30. As shown in FIGS. 4–6, a plurality, such as eight or more, of individually formed circumferentially spaced thin pads 31 is interposed between the hub and sleeve in the annular clearance space therebetween. Each pad 31 comprises a layer 32 of resilient rubber-like material preferably bonded to the bore 33 of the hub 29. The interior facing of each pad is formed by a high modulus layer 34 formed of mylar plastic, glass filled epoxy micarta, or equivalent relatively rigid material. This laminar construction of the pads 31 renders them radially quite stiff or rigid and stable while enabling them to yield both axially and circumferentially in sufficient degrees to permit the essential relative movements between the hub and sleeve of the sheave without any relative sliding of parts resulting in frictional wear. In effect, the several pads yield and allow the necessary relative movements in response to circumferential and axial shearing stresses transmitted through the pads due to loading of the sheave. The rigid facings 34 effectively resist any tendency of the compressible pad elements 32 to flow outwardly in all directions while under compression. While under heavy loading, this tendency if not effectively resisted will produce internal friction in the pads causing them ultimately to break down and disintegrate with a fretting action. The rubber-like layer 32 is chemically bonded to both the facing 34 and the bore of the flange hub 29. Preferably, as indicated in FIG. 5, the pads 31 are applied to the hub 29 near the opposite ends of the hub bore where the maximum load conditions occur, as was explained in connection with FIG. 1.

It will be appreciated that during operation of a motion control sheave the relative axial and circumferential movements per revolution between the flange hub 29 and sleeve 30 are small. Since the laminar pads are yielding and somewhat compressible, they automatically restore themselves to a relaxed form substantially filling the maximum radial clearance space 28 whenever the unloaded zone is reached. Each pad 31 simply comes into contact with the sleeve 30 at point $c$, for example, FIG. 3, and allows the necessary circumferential shift to occur between the parts 29 and 30 as the sheave rotates through 90° toward the point $e$. When this point is reached, the load comes off of the sheave and the pad 31 returns to its normal relaxed position. While under load, there is no opportunity for wear to occur between the pad facing 34 and the sleeve 30 because within the needed limits of relative movement, the rubber-like pad layers will always yield sufficiently to allow the movement between the pad facings and sleeve without any sliding action.

Even when the sheave is adjusted from one pitch diameter to another by axial shifting of the flange 20 through conventional mechanism, there is no sliding movement between the pad facings 34 and the sleeve 30. Assume, for example, that the flange 20 must move axially at a rate of 1 inch in 10 seconds. In this 10 seconds, the sheave will normally turn about 300 revolutions, so that the flange moves only about 0.0033 inch axially per revolution. Even if the movement were ten times this much per revolution, the pads 31 can shift sufficiently axially each revolution to assure the absence of sliding because a pad 31 is in contact with the sleeve 30 for no more than one-third of a revolution.

It is possible that for conditions of very light sheave loading, the rigid facings 34 might be successfully eliminated and rubber-like material alone might be employed for the pads bonded to the flange hub. In some instances, an uninterrupted rubber-like ring in the bore 33 near each end of the hub 29 might be effective to permit the necessary axial and circumferential relative movements without wear, but again under conditions of very light loading.

To minimize bond failure between layers of the pads under conditions of heavy loading and to reduce bond stress which apparently increases directly proportional to an increase in thickness of the yielding pad layer, a pad formation illustrated in FIG. 7 has been found to be superior. In this figure, the flange hub 29 has bonded to the bore thereof a pad 35 whose sleeve contact facing 36 is formed of glass filled epoxy micarta. The remainder of the pad body is composed of alternate thin rubber-like layers 37 and intervening stiff layers 38 conveniently formed of steel shim stock. This construction greatly increases the allowable load on the pad before any fretting occurs. It has been found that the higher the modulus of the intermediate layer or layers 38 on the interior of the pad 35, and the higher the modulus of the sleeve contact layer 36, the greater the load-bearing capability of the pad. The actual amount of rubber needed in the pad is proportional to the extent of movement or shifting which is going to occur on a given sheave. The larger the sheave, the greater will be the extent of axial and circumferential relative movement between hub and sleeve. Also the greater the radial clearance between these elements, the greater the relative movement will be. Consequently, the precise number of yielding layers and high modulus layers in any given pad 35 will vary in accordance with the above factors of sheave design.

It should also be mentioned at this point that the pad 31 or 35 does not of necessity have to be bonded to the flange hub 29 or to either member 29 or 30 of the sheave. It can have a high modular facing or layer or each of its outer surfaces with alternating layers of rigid and yielding material in between the outer faces.

FIG. 8 shows a further adaptation of the invention usuable in some cases where the sleeve 39 is connected to the hub 40 for relative axial movement by a rigid key 41 engaged in a keyway 42 of the flange hub. Circumferentially spaced pads 43 essentially similar to the pads 31 or 35 are disposed in the annular clearance space surrounding the sleeve 39 except at the location of the key. Additional pads 44 are mounted in the opposite sides of the keyway 42 with their rigid contact facings 45 engaging the key 41. With this arrangement, the only sliding movement which can occur during sheave operation is between the facings 45 and the key 41, and this will occur only during speed adjustment of the sheave. During normal operation at one pitch setting of the sheave, there will be no sliding movement or wear and the pads 43 and 44 will allow the required relative movements axially and circumferentially between hub and sleeve as described above in connection with FIGS. 4 through 6.

An ideal embodiment of the invention applied to a motion control sheave or similar machine element is depicted in FIGS. 9 to 14. In these figures which are partly schematic for clarity, the flange hub 46 of the sheave has a polygonal opening 47 and the mating sleeve component 48 is similarly shaped in cross section. For simplicity, the opening 47 and the sleeve 48 have been shown as square in the drawings but the invention is not limited to this one shape as any polygonal form may be employed.

FIG. 9 shows a condition where no torque is being transmitted by the sheave but the same is being subjected to belt tension forces $T_1$ and $T_2$ which are equal forces. There is actually a cocking effect on the hub 46 generally as illustrated in FIG. 1 for the circular form of flange hub and sleeve and FIG. 9 is a view of the end of the hub and sleeve remote from the belt. In FIG. 9, the surfaces $a$ and $d$ have equal uniform pressure thereon due to belt loading forces $T_1$ and $T_2$, as indicated by the force arrows 49. The surfaces $b$ and $c$ of the sleeve 48 are unloaded, and adjacent to these surfaces there is a relatively large clearance between the hub and sleeve. Laminar pads 50 of rectangular form, FIG. 13, constructed similarly to the multilayer pads 35 are intervened between the flat sleeve faces $a$, $b$, $c$ and $d$ and the opposing flat faces of the polygonal opening 47, as shown in FIGS. 9 to 12. Again referring to FIG. 9, there is some clearance space 51 between the unloaded surfaces $b$ and $c$ and the adjacent pads 50, while the pads 50 at the surfaces $a$ and $d$ are loaded and no clearance exists.

Preferably each pad 50 has a contact face or layer 52 for engagement with the faces of the sleeve 48 and alternating layers 53 and 54 of yielding and rigid materials of the type previously described. The exterior rubber-like layer 53 is preferably bonded to the faces of the hub opening 47 while the rigid contact fact 52 of each pad 50 abuts one of the flat faces $a$, $b$, $c$ or $d$ of the sleeve 48. Preferably, although not necessarily, each pad 50 is grooved longitudinally and transversely at 55 and 56 through its contact facing 52 and all other layers except the mounting or bonding layer 53 which maintains the integrity of the pad 50. This grooving essentially preserves the feature of a multiplicity of separated pads, such as the pads 31 in the prior embodiment, rather than a single uninterrupted construction. The multiple or separated pad sections have greater ability to yield in shear both circumferentially of the sheave or axially in comparison to a continuous pad structure. The pads 50 at each of the faces $a$, $b$, $c$ and $d$ in any event are separate and independent from adjacent pads in order to have the greatest efficiency in permitting the necessary relative movements between hub and sleeve, to be further described.

Figure 10:
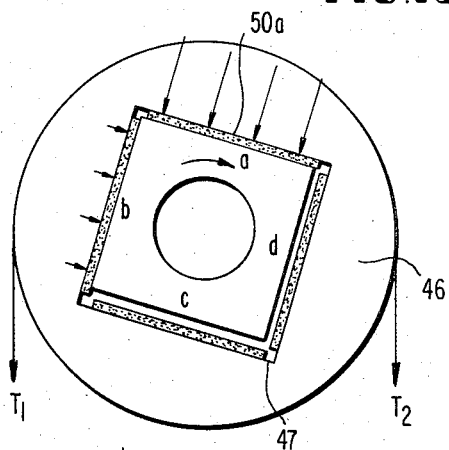

Referring to FIG. 10, when the sheave is rotated through an angle of 60° from its position in FIG. 9, a different condition of loading occurs. Due to the yielding ability in shear of the pad designated 50a in FIG. 10, the flange hub 46 has shifted to the right by the amount of the clearance shown and the clearance is no longer at $b$ but instead is at the surface $d$. While this action has been taking place, the pad 50a has been continuously under load, so that the described shifting of the hub relative to the sleeve has not resulted in any sliding, but has taken place through the ability of the pad 50a to yield or stretch in shear. As the sheave rotates still further, a point is reached where the surface $a$ is under no load, at which time the pad 50a will restore itself to its original shape in readiness to carry a new load after 180° of rotation. In FIG. 10, the unequal length force arrows at the faces $a$ and $b$ indicate the relative load distribution at the particular angular position shown.

Figure 11:
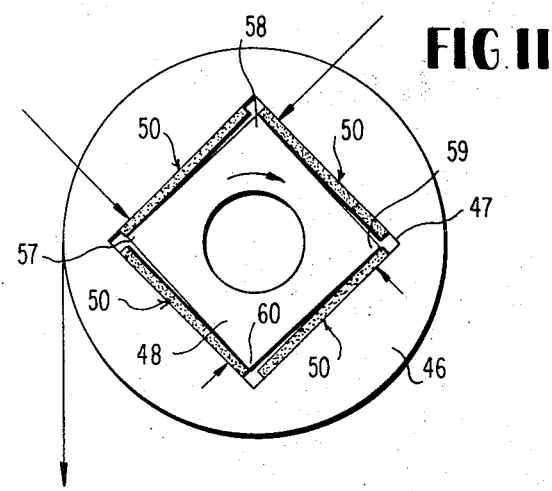
Figure 12:
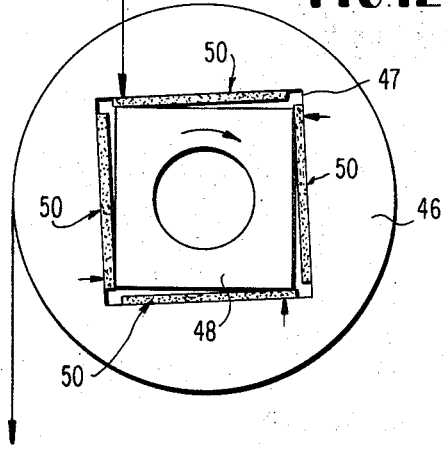
Figure 14:
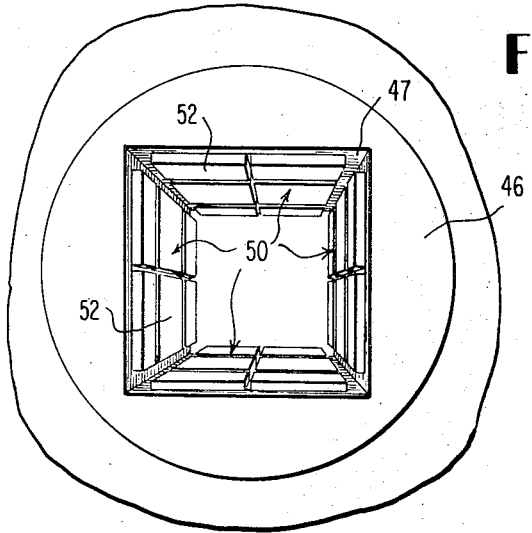
FIG. 14 is a perspective view showing pads of the type illustrated in FIG. 13 applied to a polygonal hub opening.
Figure 13:
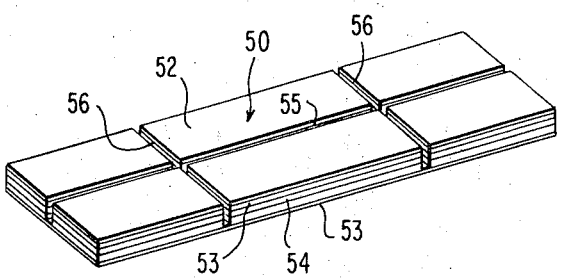
FIG. 13 is a perspective view of a pad element employed with the structures of FIGS. 9 through 12.

When torque begins to be applied to the movable flange of the sheave, the distribution of forces indicated in FIG. 11 is established. The clearance is taken up by rotation of the flange hub 46 relative to the sleeve 48, so that the four pads 50 are all in contact with the sleeve simultaneously. At low torque transmission and low pitch diameter, clearance of the type shown in FIG. 10 may still exist with the corners 57 and 58 in contact with the pads but with no load or corner contact at 59 and 60. As the sheave rotates while under torque loading, each pad 50 encounters a varying load from a minimum to a maximum per revolution as shown by the force arrows in FIGS. 11 and 12. The necessary relative movements between the flange hub and sleeve will take place due to the ability of the pads 50 to compress, and to yield or stretch in shear. In effect, there will be no sliding contact between the faces or corners of the sleeve 48 and the high modulus facings 52 of the pads 50, as the yielding of the pads will prevent such sliding. Therefore, in essence, the polygonal embodiment of the invention shown in FIGS. 9 through 14 operates in basically the same way as the previous embodiments.

It is to be understood that the forms of the invention herewith shown and described are to be taken as preferred examples of the same, and that various changes in the shape, sizes and arrangement of parts may be resorted to, without departing from the spirit of the invention or scope of the subjoined claims.

I claim:

1. A wear-resistant motion control sheave comprising telescoping hub and sleeve elements both of which turn with a shaft on which they are mounted, said hub and sleeve elements both adapted to engage a transmission belt, there being a clearance space between the sleeve element and the bore of said hub element, plural separated pad segments disposed in said clearance space between said sleeve and hub elements and being fixedly secured to one of said elements in surrounding relationship to the sleeve element, said pad segments having bodies formed of elastic material which may yield circumferential and axially of the hub and sleeve elements, and said pad segments having interior high modulus facings for contact with the periphery of the sleeve element during cyclic rotation of the sheave, said pad segments possessing high resistance to compression radially and yielding elastically substantially in both the circumferential and axial directions to accommodate cyclical relative movements of the hub and sleeve elements without sliding contact therebetween.

2. The structure of claim 1, and said pad segments being bonded to the bore of the hub element in spaced relationship.

3. The structure of claim 2, and said pad segments being arranged in two separated groups near the opposite ends of the bore of said hub element.

4. The structure of claim 2, and said telescoping hub and sleeve elements being cylindrical and said pad segments being cylindrically curved to conform to the shapes of the hub and sleeve elements.

5. The structure of claim 2, and said telescoping hub and sleeve elements being non-circular in cross section, and said pad segments being shaped to conform to the shape of the clearance space between the hub and sleeve elements.

6. The structure of claim 5, and said telescoping hub and sleeve elements being polygonal in cross section and having pairs of opposing flat faces, and said pad segments consisting of individually formed flat pad units disposed in the spaces between the pairs of opposing flat faces.

7. The structure of claim 6, and each flat pad unit having a contact layer formed of relatively rigid material and a body portion formed of elastic material capable of yielding in response to shear stresses parallel to said flat faces.

8. The structure of claim 6, and each pad unit comprising a multi-layer body having a stiff contact facing and alternating layers of resilient and stiff material backing up said contact facing, said pad unit being grooved longitudinally and transversely through its contact facing and through at least some of said alternating layers to produce on the pad unit distinct separated pad segments which may yield elastically individually under shear stresses applied thereto parallel to the planes of said flat faces while simultaneously substantially resisting compressive stresses applied normal to said planes.

9. The structure of claim 8, wherein each grooved pad unit is elongated and rectangular and includes plural pad segments which are individually rectangular.

10. The structure of claim 2, and said pad segments each having a contact facing consisting of a thin layer of stiff material, and a body portion backing up said contact facing composed of alternating layers of elastic and stiff materials.

11. The structure of claim 10, and said stiff contact facing formed of plastics material and said alternating layers formed respectively of plastics material and rubber-like material.

* * * * *